United States Patent
Cooksey et al.

(10) Patent No.: US 6,519,923 B1
(45) Date of Patent: Feb. 18, 2003

(54) SYSTEM FOR COUPLING, UNCOUPLING AND CONTROLLING THE HEADER ASSEMBLY IN AN AGRICULTURAL COMBINE

(75) Inventors: William L. Cooksey, Geneseo, IL (US); Vincent M. Moster, Sunman, IN (US); Randall A. Marc, Davenport, IA (US); Mark C. Ziegler, Moline, IL (US); John Bradley Lukac, Beltendorf, IA (US); Dale W. Panoushek, Orion, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/948,378

(22) Filed: Sep. 10, 2001

(51) Int. Cl.[7] .............................................. A01D 34/04
(52) U.S. Cl. ...................................................... 56/14.9
(58) Field of Search ................................ 56/14.5, 14.6, 56/14.9, 11.1, 11.2, 11.3, 10.9, 192, 193, 153, DIG. 1, DIG. 5, DIG. 21; 60/484, 468, 428; 460/16, 20, 116, 119

(56) References Cited

U.S. PATENT DOCUMENTS

| | | | |
|---|---|---|---|
| 5,527,218 A | * | 6/1996 | Van den Bossche et al. . 460/20 |
| 5,613,352 A | * | 3/1997 | Panoushek et al. ...... 56/10.2 E |
| 5,778,644 A | * | 7/1998 | Keller et al. .................. 56/11.2 |
| 6,116,006 A | * | 9/2000 | Killen et al. .................. 56/11.9 |

* cited by examiner

Primary Examiner—Robert E. Pezzuto
(74) Attorney, Agent, or Firm—John William Stader; Larry W. Miller

(57) ABSTRACT

A system for coupling, uncoupling and controlling the operating parameters of the header assembly on an agricultural combine. A fixed coupler block on the feeder assembly of the combine is coupled with a movable coupler block on the header assembly to join hydraulic and electrical conduits by rotating a coupler handle to lock the blocks together. As the handle rotates, it also causes push-pull cables to actuate latch pins which mechanically couple the header assembly to the feeder assembly. The system senses whether a header assembly is present or not and, if present, what type of header assembly is present. In the latter case, the system then controls the operating parameters of the header assembly.

6 Claims, 7 Drawing Sheets

SYSTEM FOR COUPLING, UNCOUPLING AND CONTROLLING THE HEADER ASSEMBLY IN AN AGRICULTURAL COMBINE

FIELD OF THE INVENTION

This invention relates generally to agricultural combines. It relates particularly to a system for coupling, uncoupling and controlling the header assembly in an agricultural combine.

BACKGROUND OF THE INVENTION

An agricultural combine, whether configured for harvesting grain or some other crop, includes a header assembly for cutting and collecting crop material, a feeder assembly for feeding the collected crop material to a threshing assembly, and a threshing assembly for separating the grain from the crop. The threshing assembly is mounted in a self-propelled vehicle and the feeder assembly is mounted on the front of the vehicle frame in cantilevered relationship. The header assembly is releasably coupled to the front end of the feeder assembly.

An agricultural combine must frequently have its header assembly changed, i.e., coupled to, or uncoupled from, the front end of the feeder assembly, however. This is necessary when a different type, or different size, header assembly is called for. It is also necessary when the combine must move by road to a new working location. When it is necessary, mechanical couplings which join the header assembly to the feeder assembly must be released. In addition, the hydraulic and electrical circuits running from the combine power plant and control panel on the vehicle frame to the header assembly must be uncoupled.

The header assembly is powered and controlled hydraulically and electrically from the vehicle. A power take-off shaft connection is also provided from the vehicle. Hydraulic and electrical conduits extend along the feeder assembly, to the header assembly, through appropriate valves and operator control devices. To facilitate coupling and uncoupling of the header assembly, a plug and socket unit for some or all of the conduits is sometimes employed between the feeder assembly and the header assembly, where it is readily accessible to the operator. The plug and socket unit may contain both electrical and hydraulic connectors, as well as hydraulic control valves.

It is conventional for the mechanical coupling and uncoupling of a header assembly to be accomplished independently of the coupling and uncoupling of hydraulic and electrical circuits. To uncouple, for example, the operator gets down out of the combine's cab and manually uncouples the electrical and hydraulic circuits. Then, the mechanism coupling the header assembly mechanically to the feeder assembly must be separately released, including both mechanical latches and power take-off shafts. The feeder assembly conveyor must also be separately deactivated, or a guard cover placed over its open mouth.

When a new header assembly is positioned for coupling, for example, the operator operates the mechanical coupling mechanism to physically connect the header assembly to the feeder assembly. The electrical and hydraulic circuits are then recoupled in a separate operation or operations. In another operation, the power take-off shafts are coupled.

The aforementioned coupling and uncoupling operations are time consuming, complicated and sometimes result in individual coupling components getting dirty. The operator may have to get down under the feeder mechanism to manually operate the mechanical coupling mechanism. He must then turn to the electrical and hydraulic conduits and couple or uncouple them. The conveyor may also have to have a guard cover placed over its mouth (a requirement in some markets).

In addition to the foregoing requirements, when a different type of header assembly is called for, a corn head assembly instead of a grain head assembly, for example, different operating parameters and limitations are called for. In conventional combines, this normally requires the operator to determine (or recall) what parameters and limitations are called for and manually make control adjustments to assure that they are complied with.

SUMMARY OF THE INVENTION

It is an object of the present invention to provide an improved system for coupling, uncoupling and controlling the header assembly in an agricultural combine.

It is another object to provide a system of the aforedescribed character which permits the operator to mechanically couple the header assembly to the feeder assembly and, in the same operation, couple hydraulic and electrical conduits between the header assembly and feeder assembly.

It is still another object to provide a system which automatically renders the feeder assembly conveyor inoperative when the header assembly is uncoupled.

It is yet another object to provide a system which automatically adjusts header assembly operating parameters and limitations when different types of header assemblies are coupled to the feeder assembly in a combine.

The foregoing and other objects are realized in a system including a coupler block fixed on one side of the feeder assembly housing. The fixed coupler block contains reel drive, reel lift and reel fore/aft valves, and any other desired header or feeder function control valves, and is connected to fluid pumps on the combine through supply and return hydraulic conduits. Electrical conduits from the combine's electrical harness are also connected to the fixed block. The front face of the fixed block contains two reel drive function hydraulic couplers, two reel fore/aft hydraulic couplers, a reel lift hydraulic coupler and hydraulic couplers for any other header function control valves. It also has one or more electrical connectors.

The system also includes a movable coupler block connected to header assembly fluid motors and actuators, and to electrical/electronic devices, through hydraulic and electrical conduits. The front face of the movable coupler block contains reel drive hydraulic couplers, reel fore/aft hydraulic couplers, a reel lift hydraulic coupler, hydraulic couplers for any other header function hydraulic control valves and one or more electrical connectors for the conduits in the header assembly's electrical harness.

The system is "smart" in that it recognizes the type of header assembly which it is being connected to the feeder assembly when the coupler blocks are mated. The operating parameters of the header assembly are adjusted and limited automatically.

The system further includes a pair of spring-loaded latch pins on the header mounting frame of the feeder assembly. A push-pull cable is connected to each latch pin at its front end and to a coupler plate which is rotatably mounted on the fixed coupler block. A coupler handle on the coupler plate is rotated by the operator to move it between a rearward position where the latch pins are retracted and the header assembly is uncoupled, and a forward position where the latch pins are extended and they couple a header assembly mounting frame to the feeder assembly mounting frame.

Before the operator moves the handle forward to mechanically couple the header assembly and feeder assembly together, however, the operator manually inserts the hydraulic couplers and electrical connectors of the movable block into corresponding hydraulic couplers and electrical connectors on the fixed block. When the coupler handle rotates the coupler plate forward, cam arms on the coupler plate engage projections on the top and bottom of the movable coupler block and lock the movable block in place.

When the coupler plate is rotated between its forward and rear positions to uncouple the blocks and the header assembly once again, it renders the feeder conveyor drive circuit inoperative. This prevents an exposed feeder assembly from continuing to run, or having the drive engaged and begin to run, and pose a safety hazard.

BRIEF DESCRIPTION OF THE DRAWINGS

The invention, including its construction and method of operation, is illustrated more or less diagrammatically in the drawings, in which.

DETAILED DESCRIPTION OF THE PREFERRED EMBODIMENT

Figure 1:
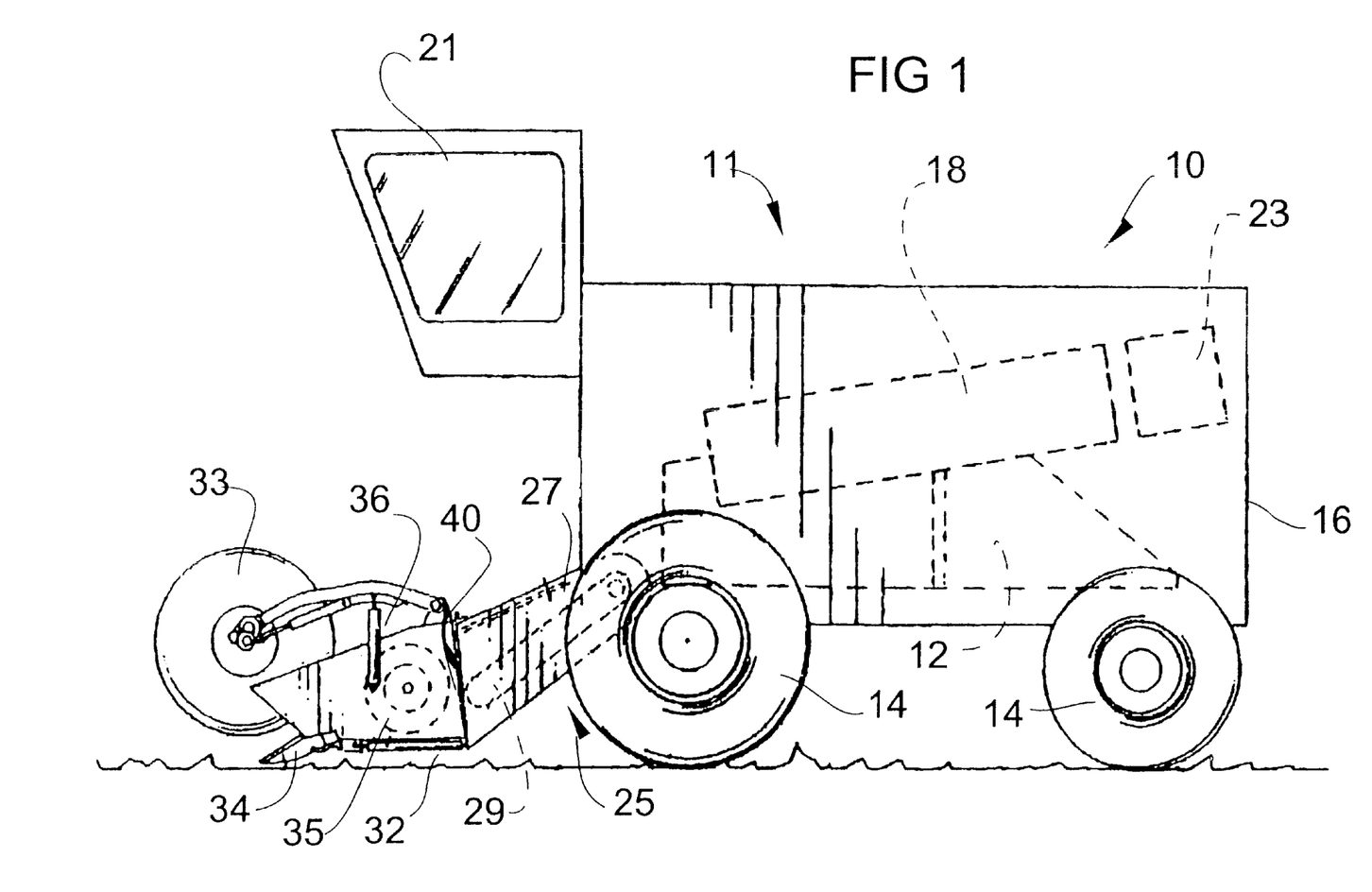
FIG. 1 is a side elevational view of an agricultural combine, including a header assembly mounted in operational relationship, and incorporating a coupling, uncoupling and control system embodying features of the present invention.

Referring now to the drawings, and particularly to FIG. 1, an axial-flow, rotary combine is seen generally at 10. Thus, the present invention will be described and illustrated in the context of a rotary combine. However, it should be understood that it is equally applicable to other types of combines.

The combine 10 includes a self-propelled vehicle 11 including a frame 12 mounted on wheels 14. The frame 12 supports a combine body 16 in which an axial flow, rotary threshing assembly 18 is mounted. An operator's cab 21 is mounted on the frame 12 in front of the body 16. A power plant 23, with conventional electrical and hydraulic power capabilities, is mounted on the vehicle 11 within the body 16.

Extending forwardly from the vehicle 11, underneath the cab 21 and immediately in front of the rotary threshing assembly 18, is a feeder assembly 25. The feeder assembly 25 is permanently mounted on the front end of the frame 12 and, referring to FIG. 2, comprises an elongated housing 27 containing an endless conveyor 29 running longitudinally through it.

Figure 2:
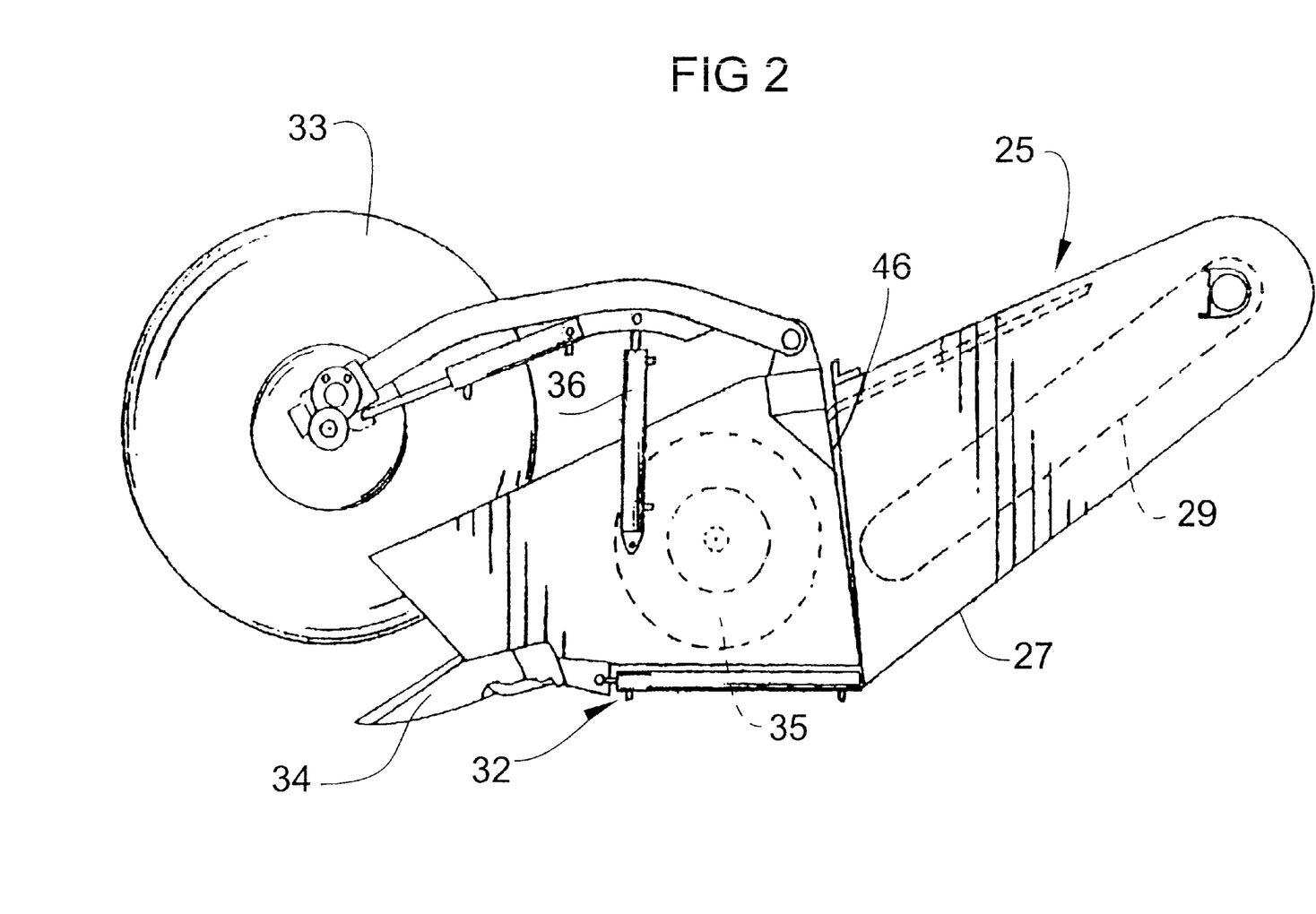
FIG. 2 is an enlarged side elevational view of coupled header and feeder assemblies, incorporating the system of the invention.

Coupled to the front end of the feeder housing 27 is a transversely extending grain header assembly 32. The grain header assembly 32 may be anywhere from twelve to forty-eight or more feet wide. It contains a conventional reel 33, a crop cutter 34 and an augur 35.

Although a grain header assembly 32 is illustrated, it will be understood by those skilled in the art that the combine 10 might alternatively be equipped with other types of header assemblies, including a corn header assembly, a windrow pick-up header assembly, a draper header assembly or "finger" heads, for example. The system of the present invention is applicable to any such assembly and, as will hereinafter be discussed, is capable of distinguishing between them and automatically adjusting operating parameters and limitations based on the type of header assembly which is mounted.

The reel 33 is driven in a conventional manner by a hydraulic motor suitably arranged in the header assembly 32, and is positioned by hydraulic cylinders 36. Hydraulic cylinders (not shown) also tilt the header assembly laterally to adjust for different terrain.

The aforedescribed hydraulic cylinders and motor are all supplied with fluid under pressure from hydraulic pumps associated with the power plant 23 in the combine body 16. A hydraulic conduit complex 37 including a combine conduit group 37A and a header assembly conduit group 37B are coupled at a coupler block assembly 50 embodying features of the invention. Control of the cylinders and motor is effected by the operator through an electrical conduit complex 38 including a combine conduit harness 38A and a header assembly conduit harness 38B at the coupler block assembly 50.

The header assembly 32 is coupled, at its back wall 40, to a rectangular frame 41 which forms a mouth on the front end of the feeder assembly housing 27. Laterally extending latch pins 42 and 43 on the mouth frame 41 are retracted inwardly to permit the frame to enter a correspondingly shaped, but slightly larger mounting frame 46 on the back of the header assembly 32, and then extended outwardly to lock the frames together.

According to the present invention, the latch pins 42 and 43 are operated by a latch operating mechanism 49 mounted on the coupler block assembly 50 and embodying features of the invention. Both are components of the smart coupling, uncoupling and control system 50 of the present invention.

The system 50 is smart in that it automatically sets header assembly 32 operating parameters and limitations based on the type of header assembly which is coupled; grain head or corn head, for example. In other words, it senses what type of header assembly is coupled (and whether one is present) and sets header assembly operating parameters and limitations accordingly.

According to the invention, the system 50 is also effective to make connections in the hydraulic conduit complex 37 and the electrical conduit complex 38. In this regard, the hydraulic conduit complex 37 comprises a hydraulic supply conduit 51 which extends forwardly from the combine power plant 23 along the outside of the feeder assembly housing 27 into a valve block 52 comprising half of the coupler block assembly 39. A hydraulic return conduit 53 extends rearwardly from the valve block 52 to the power plant. A hydraulic sensor conduit 55 extends from the valve block 52 to the power plant. The electrical conduit complex 38 includes an electrical conduit 57 which also extends from the block 52 to the power plant (through the operator's control panel) and forms part of the combine's electrical harness 38A.

The valve block 52 is mounted on a bracket 58 welded or bolted to the side of the housing 27. The block 52 contains a reel drive control valve 61, a reel lift-lower control valve 62 and a reel fore/aft control valve 63. It also contains a lateral tilt control valve 65 for controlling tilt of the header assembly 32. It might also contain other control valves (not shown), as needed; a feeder reverser control valve, for example.

At this point it is appropriate to again point out that the invention is being described in the context of a combine 10 including a grain header assembly 32. In other contexts, the reel drive might be used for a pick-up drive or a draper drive, for example. The reel fore-aft control may be used for corn head stripper plate adjustment or to fold corn heads, for example.

In any event, the flat front face 67 of the block 52 has a pair of reel drive hydraulic coupler sockets 71 and 72, a pair of reel fore/aft hydraulic coupler sockets 74, 75 and a reel lift hydraulic coupler socket 77 formed into it. It also has electrical connector(s) 79 formed into it.

Extending from one side of the block 52, adjacent the face 67, separate lateral tilt cylinder hydraulic hose connections 81 and 82 are illustrated. These connections, or hose connections for other functions, may be mounted here. They are positioned to facilitate easy separate connection in a manner hereinafter discussed.

The block 52 is adapted to receive and couple with a header assembly valve block 84. The block 84 is not rigidly mounted. It is flexibly supported on the flexible hydraulic conduits and electrical conduits which extend rearwardly from fixed mountings on the header assembly 32 and form part of the hydraulic conduit harness 37 B and electrical conduit harness 38 B.

The block 84 has a pair of reel drive hydraulic couplers 87 and 88 extending from its front face 89. A pair of reel fore/aft hydraulic couplers 91, 92 are also mounted in the block 84 and extend from its front face 89. In addition, a reel lift hydraulic coupler 95 and an electrical connector 97 are also mounted in the block 84 and extend from its front face 89.

The block 84 has reel drive hydraulic hose connections 101 and 102 on its back face 103. It also has reel fore/aft hydraulic hose connections 105 and 106, and a reel lift hydraulic hose connection 108 thereon. An electrical connector 110 completes the connector group on the back face 103 of the block 84.

Separate from the header assembly hydraulic conduit complex 37 and electrical conduit complex 38, connected to the block 52, is a pair of tilt cylinder hoses (not shown). The tilt cylinder hoses terminate respectively, in lateral tilt hose connections 81 and 82 on the fixed block 52. The lateral tilt cylinder hoses 111 and 112 do not cross to the block 84 because the tilt cylinder (not shown) is mounted on the feeder assembly 25.

The latch operating mechanism 49 of the system 50 includes upper and lower cam plates 122 and 124 rotatably mounted on the fixed coupler block 52. The cam plates 122 and 124 are rigidly connected at upper and lower ends of vertical pins 126 journalled in the block 52 for rotation in the block.

Figure 3:
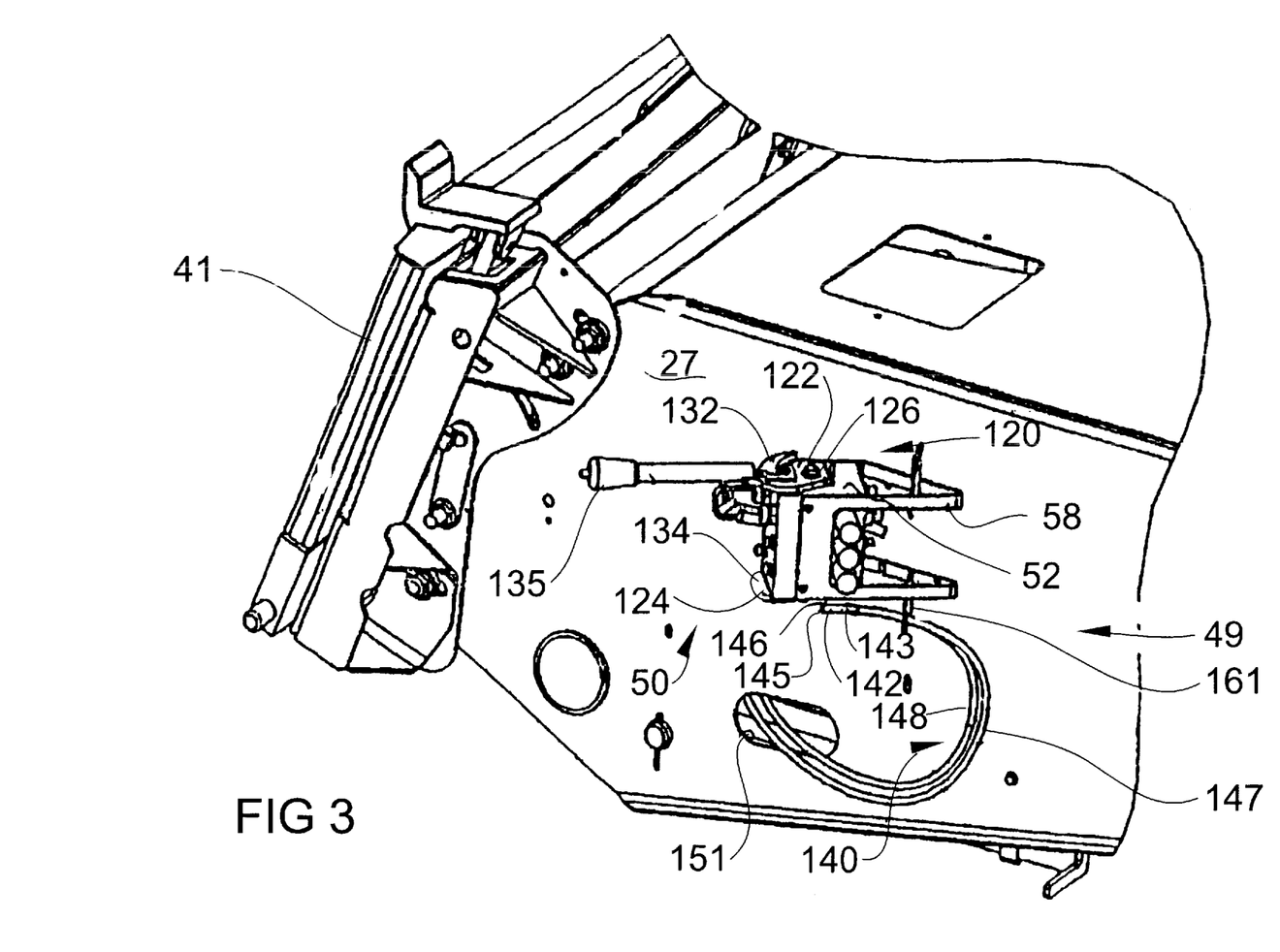
FIG. 3 is an enlarged side view of a portion of the feeder assembly and system.

The cam plates 122 and 124 have corresponding inwardly facing (toward the feeder assembly housing 27) cam arms 132 and 134 formed thereon. An actuator handle 135 for the cam plates 122 and 124 is rigidly connected to one or both plates 122 and 124, and is used to rotate the cam plates between their latched position seen in FIG. 3 and their unlatched position seen in FIG. 5. The cam arms 132 and 134 are configured so that they will engage corresponding projections 136 and 138 protruding vertically from the top and bottom of the coupler block 84, when the block is properly seated in place by the operator and the handle 135 moved from its FIG. 5 position to its FIG. 3 position.

The latch operating mechanism 49 further includes a header latch sub-assembly 140. The latch sub-assembly 140 comprises a pair of conventional push-pull cables 142 and 143 operatively connected at their front ends 145 and 146, respectively, to the latch pins 42 and 43.

Figure 4:
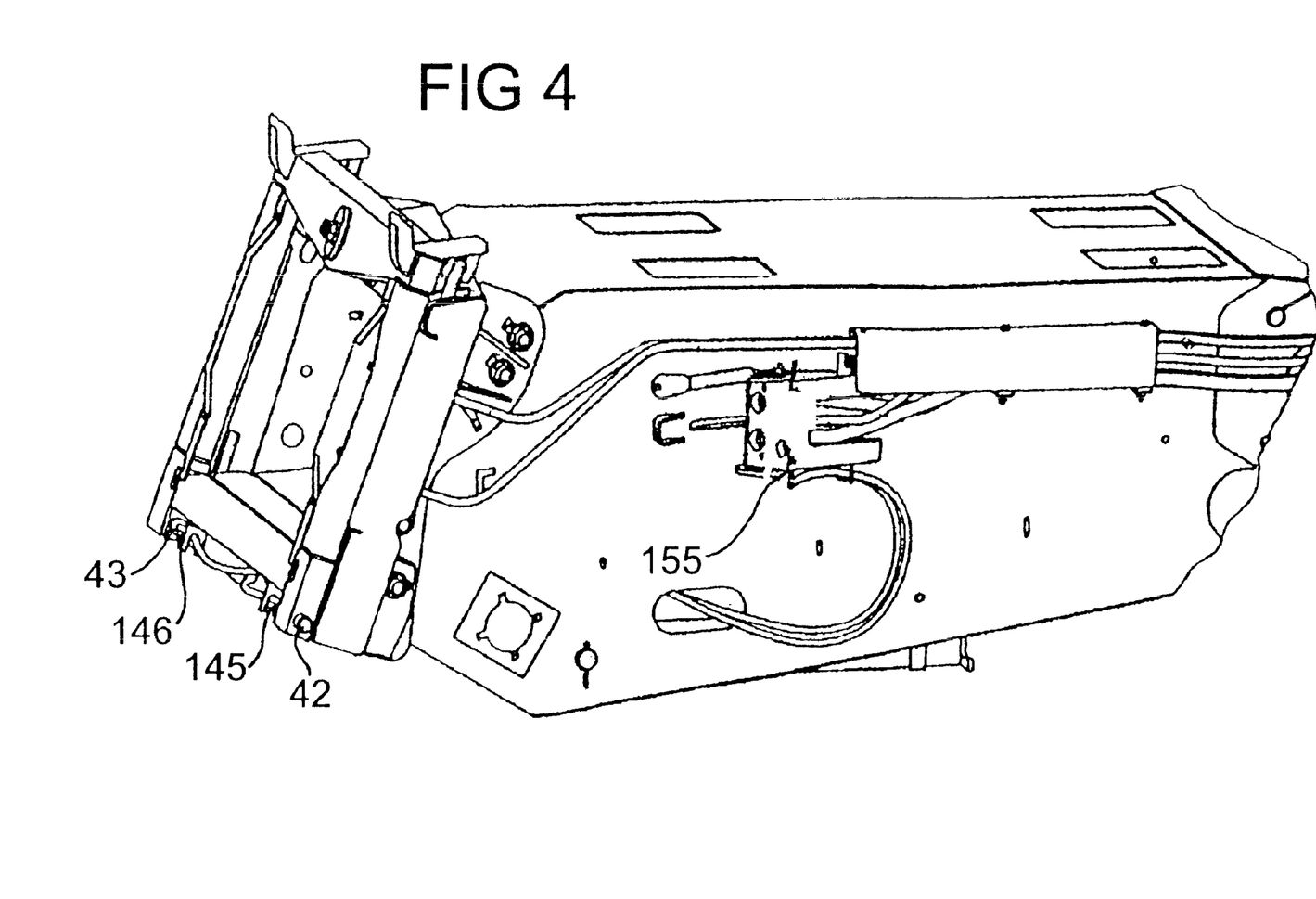
FIG. 4 is a perspective view of the front end of the feeder assembly in the combine of FIGS. 1 and 2.

The cables 142 and 143, which are slideable in respective sleeves 147 and 148, extend with the sleeves rearwardly in the bottom of the housing 27 to an elongated port 151 in the housing below the block 52 and its mounting bracket 58. The rear ends of the sleeves 147, 148 are bent forwardly in the manner best illustrated in FIGS. 3–5, to where the ends 145, 146 of the cables are fixedly connected to fittings 155 which, in the illustrated embodiment, are pivotally mounted on the lower cam plate 124.

The rear ends of the cable sleeves 147 and 148 are, in turn, clamped at 161 to the mounting bracket 58 for the block 52. Because the pivot connection between the fitting 155 and the cam plate 124 is offset to the feeder assembly side of the pivot pin 126, pivotal movement of the cam plates 122 and 124 causes the cables 142, 143 to be pushed or pulled through the sleeves 147 and 148, thus extending or retracting the latch pins 42 and 43.

Figure 5:
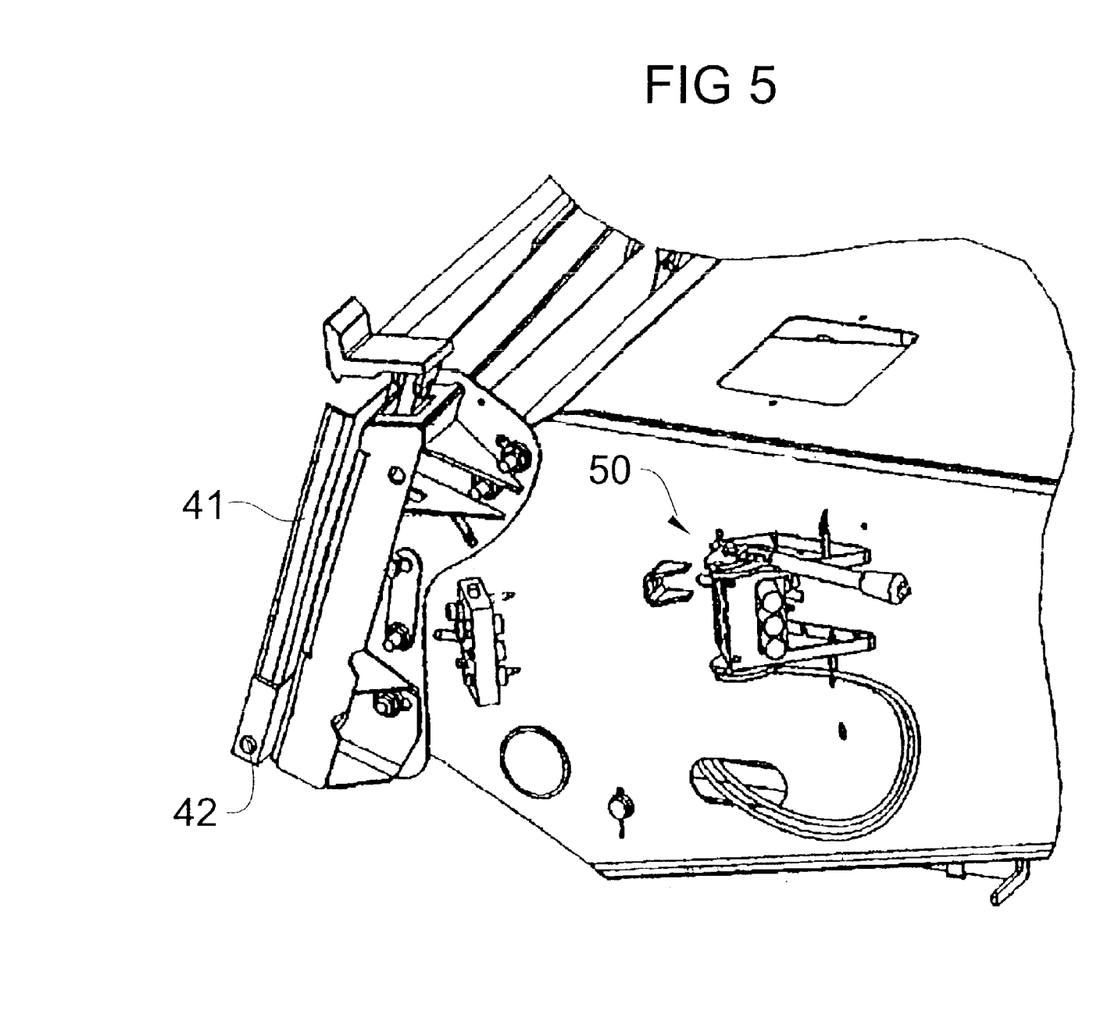
FIG. 5 is an enlarged side elevational view of a portion of the feeder assembly shown in FIG. 4.
Figure 6:
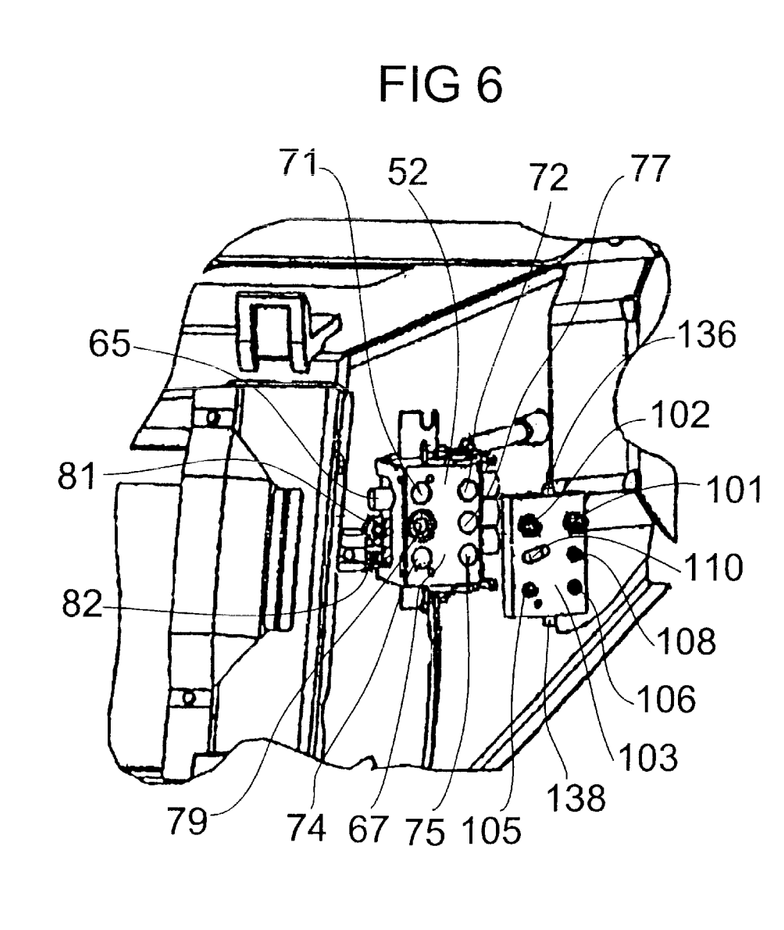
FIG. 6 is a front perspective view of a portion of the system.
Figure 7:
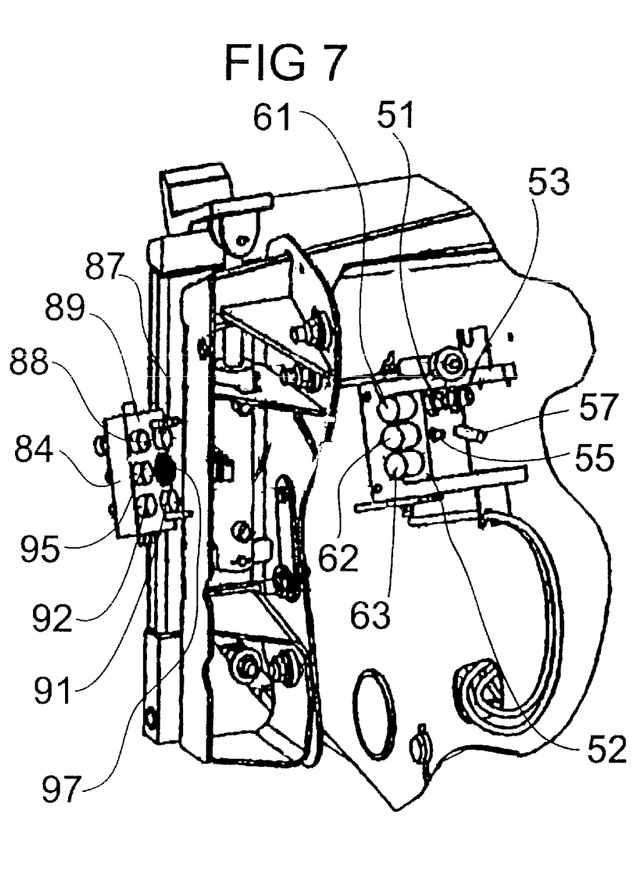
FIG. 7 is a rear perspective view of a portion of the system.

Referring now to FIG. 2, where the header assembly 32 is shown coupled to the feeder assembly 27, the operator can uncouple their hydraulic couplings and electrical connections simply and cleanly by merely moving the handle 135 rearwardly to the FIG. 5 position. The cam arms 132 and 134 rotate away from and release the coupler block 84 by moving out of locking engagement with the projections 136 and 138. At the same time, the header latch sub-assembly 140 retracts the latch pins 42 and 43.

When the latch pins 42 and 43 retract, they permit the header assembly frame 46 to be removed from the feeder assembly mouth frame 41. This is normally accomplished by the operator backing the combine feeder assembly 25 away from the header assembly 32. It will be understood, of course, that power take-off shafts are disconnected separately.

To couple another header assembly 32 to the feeder assembly, the coupler block 84 of the new header assembly is positioned against the coupler block 52 and the handle 135 is rotated forwardly, locking the block 84 to the block 52 and completing the respective hydraulic and electric connections. The push-pull cables 142 and 143 move the latch pins 42 and 43 outwardly to lock the frame 46 into the frame 41 (the new header assembly 32 having been moved into position by maneuvering the combine feeder assembly).

Figure 8:
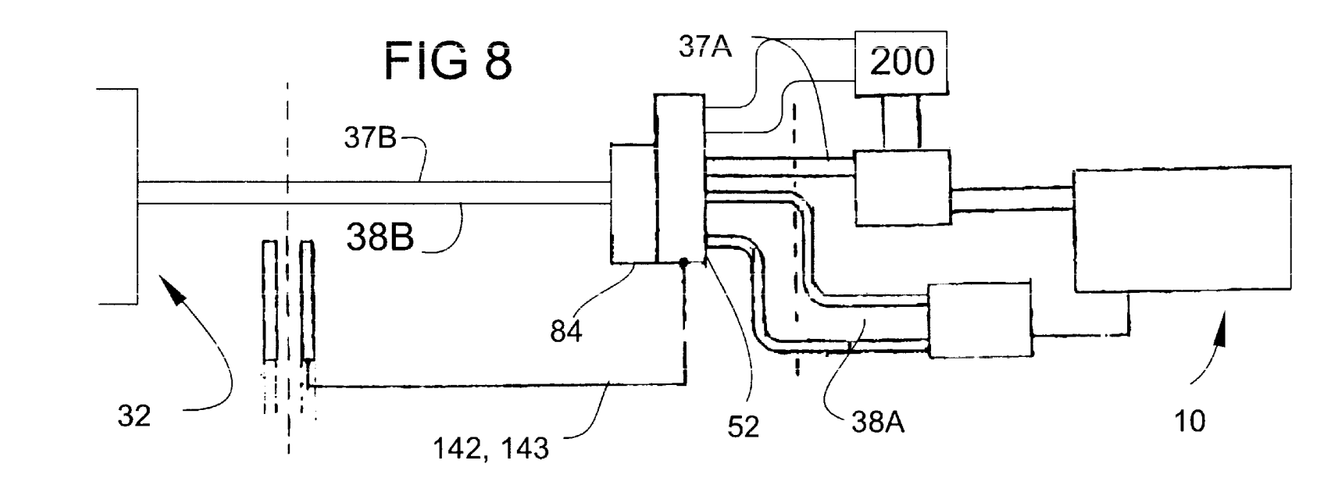
FIG. 8 is a schematic illustration of the combine and header assembly including the system of the invention.
Figure 9:
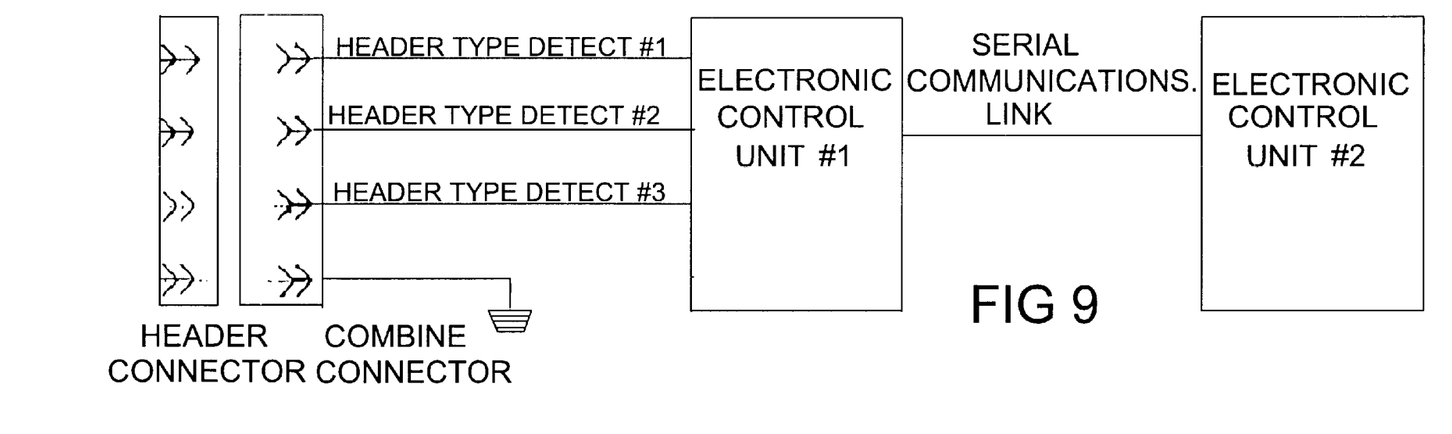
FIG. 9 is a schematic illustration of the system's features related to its smart operation.

Referring now to FIGS. 8 and 9, the combine 10, header assembly 32 and system 50 are shown schematically. When a header assembly 32 is connected to a combine 10, hydraulic and electrical connections are made in the manner herein before discussed. In addition, according to the invention, several more electrical connections are made.

According to the invention, as has been pointed out, the system 50 is smart in that it automatically controls the operating parameters and limitations of the header assembly 32 as a function of the type of assembly which is coupled. FIG. 9 schematically illustrates aspects of the system 50 related specifically to its smart characteristics. A first electrical connection, when made, completes a circuit which informs a computer processing unit (CPU) 200 in the system 50 that a header assembly 32 has been mounted. A second electrical connection, when made, completes a circuit which informs the system 50 that a specific type of header assembly has been mounted. The CPU 200 is programmed to then automatically make the system 50 set operating parameters and limitations for the header assembly.

Specifically, the system 50 includes three additional connectors 221, 222 and 223 in the block 52, and three additional and corresponding connectors 231, 232 and 233 in the block 84. The connectors 231, 232 and 233 are terminals for electrical leads 236, 237 and 238 to the CPU 200 in the combine cab. The connectors 221, 222 and 223 are terminals for electrical leads 231, 232 and 233 from the header assembly 32 which indicate (1) header assembly presence, (2) one type of header assembly, e.g., grain, (3) another type of header assembly, e.g., corn, and (4) yet another type of header assembly, e.g., folding corn.

When the connector block 84 of a header assembly 32 is coupled with the block 52 on the combine 10, a circuit is completed to indicate that a header assembly is present and, in addition, what type it is. The CPU 200 receives this information and sends control parameter and control limitation instructions to an electrical control panel 250 in the cab.

Following is a chart which explains the logic behind electrical signals transmitted by the leads 236, 237 and 238, and what information they convey:

| Connected To Ground | | | |
| --- | --- | --- | --- |
| 238 | 237 | 236 | |
| No | No | No | No Header |
| No | No | Yes | Grain Head |
| No | Yes | No | Corn Head |
| No | Yes | Yes | Folding Corn Head |

Where no header assembly 32 is coupled, all of the leads 236, 237 and 238 are open circuit and the CPU 200 knows no header is present. The feeder assembly is disabled automatically on instructions from the CPU.

When a grain header assembly is coupled, lead 236 is grounded and leads 237 and 238 remain open circuited. The CPU 200 knows, then, that a grain header assembly is present and instructs the system 50 to control operating parameters and limitations accordingly.

When a corn header assembly is coupled, lead 237 is hot and leads 236, 238 are not. The CPU receives this information and sends instructions accordingly.

According to the invention, various parameters for the display range in the system 50 are adjusted for the header type to account for the lift geometry of the feeder and the specific header attached. Since a grain head has a larger operating range than a corn head, the system 50 causes the correct display range to automatically be adjusted for the header type attached.

With automatic header type detection by the system 50, the system 50 also allows for both increasing and decreasing the drive speed. This is in contrast to conventional combines where, if the type of header is unknown, the operator is only allowed to slow the feeder/header drive from a nominal speed or not provide a variable drive. This is fine for a grain head. However, for a corn head, the operator would want to increase the speed from the nominal. For the grain head, the system 50 permits the feeder/header drive speed range to be limited from nominal to −20%. For a corn head, the full feeder/header drive speed range from nominal to +/−20% would be available.

When the system 50 does not detect any header connected, the feeder/header drive is disabled. This is a safety enhancement which provides compliance with European regulations. The European regulations require safety covers over the feeder face when no header is attached there, unless the drive is automatically disabled in this configuration. With header type detection including no header detection, the drive is automatically disabled and the safety covers are not required.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. In an agricultural combine including a header assembly and a feeder assembly, wherein said feeder assembly includes a mounting frame at its front end for seating in a complimentary mounting frame on the back of said header assembly and hydraulic conduit and electrical conduit complexes extend between said feeder assembly and said header assembly, the improvement in a system for coupling and uncoupling said mounting frames and said conduit complexes comprising:

a) a first coupler block rigidly mounted on said feeder assembly and containing hydraulic and electrical couplers connected to hydraulic and electrical conduits from said combine;

b) a second coupler block containing hydraulic and electrical connectors connected to said feeder assembly by hydraulic and electrical conduits from said header assembly;

c) a coupling device on one of said coupler members for engaging and coupling the other of said coupler members to said one coupler member; and d) latch elements for mechanically latching said frames together;

e) said coupling device having a latch actuator associated therewith which is effective to move said latch elements into latching relationship and latch said frames together when said device is manipulated to couple said blocks together.

2. The improvement in the system of claim 1 further characterized in that:

a) said coupling device comprises a rotatable cam; and b) said latch actuator comprises a push-pull cable connected to said latch.

3. The improvement in the system of claim 2 further characterized in that:

a) said latch comprises a pair of latch pins which, when extended, mechanically couple the header assembly to the feeder assembly; and b) said latch actuator comprises a push-pull cable connector to each latch pin.

4. The improvement in the system of claim 1 further characterized in that:

a) said coupling device comprises a rotatable cam on said first coupler member.

5. The improvement in the system of claim 1 further characterized in that:

a) said latch actuator comprises two push-pull cables connected to said latch and to said coupling device.

6. In an agricultural combine including a header assembly and a feeder assembly, wherein said feeder assembly includes a mounting frame at its front end for seating in a complimentary mounting frame on the back of said header assembly and hydraulic conduit and electrical conduit complexes extend between said feeder assembly and said header assembly, the improvement in a system for coupling and uncoupling said mounting frames and said conduit complexes comprising:

a) a first coupler block rigidly mounted on said feeder assembly and containing hydraulic and electrical couplers connected to hydraulic and electrical conduits from said combine;

b) a second coupler block containing hydraulic and electrical connectors connected to said feeder assembly by hydraulic and electrical conduits from said header assembly;

c) a coupling device on one of said coupler members for engaging and coupling the other of said coupler members to said one coupler member; and d) said system including sensing elements on said coupling device which determine whether a coupling has taken place and, if so, what type of header assembly has been coupled.

* * * * *

UNITED STATES PATENT AND TRADEMARK OFFICE
CERTIFICATE OF CORRECTION

| | | |
|---|---|---|
| PATENT NO. | : 6,519,923 B1 | Page 1 of 1 |
| DATED | : February 18, 2003 | |
| INVENTOR(S) | : Cooksey et al. | |

It is certified that error appears in the above-identified patent and that said Letters Patent is hereby corrected as shown below:

Title page,
Item [75], Inventors, 3$^{rd}$ Inventor should be corrected to read as follows:
-- (US); Randall A. Maro, Davenport, IA --
5$^{th}$ Inventor should be corrected to read as follows:
-- (US); John Bradley Lukac, Bettendorf, --

Signed and Sealed this

Twenty-first Day of October, 2003

JAMES E. ROGAN
*Director of the United States Patent and Trademark Office*